Dec. 27, 1949   R. B. HUNTER   2,492,639
ELECTRIC MOTOR CONTROL
Filed May 16, 1946
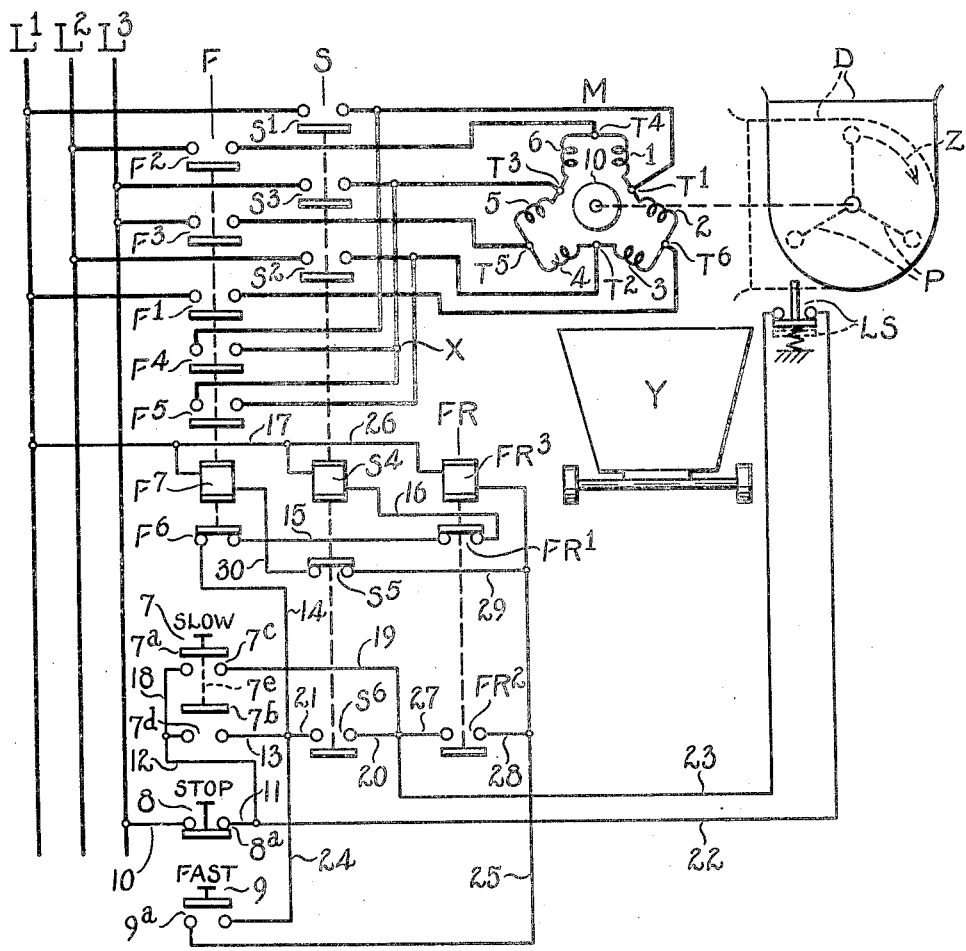
Inventor
Richard B. Hunter
By Frank H. Hubbard
Attorney Patented Dec. 27, 1949

2,492,639

UNITED STATES PATENT OFFICE 2,492,639

ELECTRIC MOTOR CONTROL

Richard B. Hunter, Shorewood, Wis., assignor to Cutler-Hammer, Inc., Milwaukee, Wis., a corporation of Delaware Application May 16, 1946, Serial No. 670,064

9 Claims. (Cl. 318—305)

This invention relates to improvements in electric motor control. Although not limited thereto, the invention is particularly adapted for control of the driving motor of a dough mixing machine.

In a dough mixing machine of the character herein contemplated there are two operating positions, namely, the mixing position and the dumping position. The control system includes a limit switch which is automatically closed when the parts are in mixing position, and opened when the parts are in dumping position. The parts of the machine, of course, include a container for the dough and a motor driven element within the container for effecting mixing of the dough.

I have illustrated the invention as applied to the control of an alternating current driving motor having primary windings to be selectively connected in circuit to provide for either slow speed operation or fast speed operation of the motor. The control system includes an electromagnetic contactor adapted when energized to complete a circuit for slow speed operation of the motor; energization of said contactor being subject to control by a special form of pushbutton switch having upper and lower bridging members; the upper bridging member being first engaged with its associated contacts but being ineffective to complete the energizing circuit pending engagement of the lower bridging member with its associated contacts. Conversely, upon partial release of said pushbutton, such as to provide for disengagement of the lower bridging member the energizing circuit of the slow speed contactor will be maintained pending full release of the pushbutton, with consequent disengagement of the upper bridging member from its contacts. This arrangement prevents rapid "tickling" of the slow speed contactor, thereby avoiding rapid deterioration of the main contacts thereof.

Moreover, it is desirable that the motor shall not be operable at fast speed until it has first been operated at slow speed by operation of the aforementioned pushbutton. It is also desirable that, after the motor has been connected for operation thereof at fast speed, the motor will not be transferred back to slow speed by merely releasing the fast speed pushbutton, even though the slow speed pushbutton switch may have been manually held in fully closed position. By this means breaking of driving chains or gearing (due to a rapid change from fast speed to slow speed of the driving motor) is effectively prevented.

It is further desirable that during the mixing operation the motor may be operated continuously at either slow speed or fast speed without requiring manual retention of either the slow speed pushbutton or the fast speed pushbutton in depressed position; whereas when the dough mixing apparatus is in the "dump" position it is preferred that the driving motor will be operated only during manual depression of either the slow speed pushbutton, or of both pushbuttons; the arrangement being such that by momentary closure of the fast speed pushbutton during maintenance of the slow speed pushbutton in at least partially depressed position the fast speed relay and the fast speed contactor may be energized and thereafter maintained energized by such partial depression of said slow speed pushbutton.

My invention has among its objects to provide for attainment of all of the aforementioned desirable results.

Other objects and advantages of my invention will hereinafter appear.

The accompanying drawing, consisting of a single figure, illustrates schematically and diagrammatically a preferred form of electric motor control embodying my invention.

In the drawing, the reference character M designates in general a motor, the rotatable armature 10 of which may be assumed to have a positive driving connection with the rotatable paddles or agitators, shown in dotted lines at P, of a dough mixing machine D. The primary of motor M consists of six winding sections, designated by the numerals 1 to 6, inclusive; said sections being connected end to end in series relationship to each other and forming a closed circuit. Terminals $T^1$, $T^2$ and $T^3$ are electrically connected to said sections at points between the respective pairs 1, 2; 3, 4, and 5, 6, as illustrated. Terminals $T^1$, $T^2$ and $T^3$ are respectively adapted to be connected to lines $L^1$, $L^2$ and $L^3$ of a suitable source of alternating current supply, upon closure of the normally open main contacts $S^1$, $S^2$ and $S^3$ of a slow speed contactor S; the electromagnetic closing winding of which is designated by reference character $S^4$. Contactor S is provided with normally closed auxiliary contacts $S^5$ and normally open auxiliary contacts $S^6$.

Motor M may be connected to lines $L^1$, $L^2$ and $L^3$ for fast speed operation thereof by closure of a fast speed contactor F; the same having a group of three normally open main contacts $F^1$, $F^2$ and $F^3$; a pair of additional normally open main contacts $F^4$ and $F^5$, and normally closed auxiliary contacts $F^6$. The operating winding of contactor F is designated by reference character $F^7$. Energization of the operating winding $F^7$ of contactor F is dependent upon prior closure of the normally closed auxiliary contacts $S^5$ of contactor S. Deenergization of the operating winding $S^4$ of contactor S for this purpose is insured by the provision of fast speed relay FR, having normally closed contacts $FR^1$; normally open contacts $FR^2$, and an operating winding $FR^3$. As aforestated, however, the control means hereinafter described are adapted to normally function in a manner to insure against closure of the main contacts of fast speed contactor F prior to closure and reopening of the main contacts of slow speed contactor S.

Upon energization of the winding $F^7$ of contactor F the main contacts $F^1$, $F^2$ and $F^3$ will close to provide for connection of lines $L^1$, $L^2$ and $L^3$ to the motor terminals $T^6$, $T^4$ and $T^5$, respectively. Main contacts $F^4$ and $F^5$ will be simultaneously closed to provide a common point of connection at X between the respective motor terminals $T^1$, $T^3$ and $T^2$.

The control means for contactors F and S and relay FR comprise a special form of pushbutton switch 7, designated by the legend "Slow"; a second pushbutton switch 8, designated by the legend "Stop"; and a third pushbutton switch 9, designated by the legend "Fast". Pushbutton 7 is provided with a spaced pair of bridging members $7^a$ and $7^b$, which are normally disengaged from their cooperating sets of stationary contacts $7^c$ and $7^d$, respectively. The arrangement is such that upon depression of pushbutton 7 the member $7^a$ will first engage its cooperating contacts $7^c$, but nothing is energized until the member $7^b$ engages its associated contacts $7^d$; a suitable mechanical connection being provided between members $7^a$ and $7^b$ for this purpose; as indicated by the dotted line $7^e$. The arrangement is also such that upon manual release of pushbutton 7 the bridging member $7^b$ will first disengage contacts $7^d$, and thereafter the bridging member $7^a$ will disengage contacts $7^c$. The "Stop" pushbutton 8 is provided with normally closed contacts $8^a$; and the "Fast" pushbutton 9 is provideed with normally open contacts $9^a$.

Upon full manual depression of pushbutton 7 in the manner aforedescribed, a circuit is completed for the operating winding $S^4$ of slow speed contactor S; said circuit extending from line $L^3$ by conductor 10 through the contacts $8^a$ of the normally closed pushbutton switch 8, by conductors 11 and 12 through the contacts $7^d$ of pushbutton switch 7 (which contacts are then bridged by member $7^b$), by conductors 13 and 14 through the normally closed auxiliary contacts $F^6$ of contactor F, by conductor 15 through the normally closed auxiliary contacts $FR^1$ of relay FR, by conductor 16 through the operating winding $S^4$ of contactor S, and by conductor 17 to line $L^1$. The normally open main contacts $S^1$, $S^2$ and $S^3$ are thus closed to complete the aforementioned circuit for slow speed operation of motor M. At the same time the normally closed auxiliary contacts $S^5$ of contactor S are opened, to insure against simultaneous energization of the operating winding $F^7$ of contactor F. Moreover, the normally open auxiliary contacts $S^6$ of contactor S are closed to provide a circuit shunting the lower bridging member $7^b$ and its associated contacts $7^d$. That is to say, upon partial manual release of pushbutton 7 (so that member $7^b$ is disengaged from contacts $7^d$ while member $7^a$ is held in engagement with contacts $7^c$), the energizing circuit for winding $S^4$ will extend from line $L^3$ to and through conductor 12, as aforedescribed, and thence by conductor 18 through contacts $7^c$ (then bridged by member $7^a$), by conductors 19 and 20 through said auxiliary contacts $S^6$, and thence by conductor 21 through conductor 14 to line $L^1$ in the manner aforementioned.

If the dough mixing machine is in the "mixing" position, the limit switch LS will be closed as shown, and therefore a maintaining circuit will be provided for operating winding $S^4$ entirely independently of pushbutton switch 7; so that the latter may be entirely released manually. Said maintaining circuit may be traced from line $L^3$ by conductor 10 through the normally closed contacts $8^a$ of switch 8, by conductors 11 and 22 through the limit switch LS, by conductor 23 to and through conductor 20, and thence, as heretofore traced, through winding $S^4$ to line $L^1$.

If the dough mixing machine should be in "dumping" position at the time winding $S^4$ is energized by complete manual depression of pushbutton switch 7, the limit switch LS will be opened; and, accordingly, although the energizing circuit of winding $S^4$ can be maintained by manual retention of pushbutton 7 depressed to an extent sufficient to afford engagement of member $7^a$ with contacts $7^c$, it will be apparent that upon full manual release of pushbutton 7 said energizing circuit will be interrupted, with consequent stopping of motor M.

If it is desired to stop motor M when operating at slow speed during the mixing operation it is only necessary to momentarily depress the pushbutton 8, thus interrupting the aforedescribed maintaining circuit, for operating winding $S^4$ of contactor S, which extends through the limit switch LS. Under such conditions the pushbutton 7 should previously have been at least partially released manually (to provide for disengagement of member $7^b$ from contacts $7^d$) to avoid restarting of motor M at slow speed upon manual release of pushbutton 8. On the other hand during operation of motor M at slow speed for dumping, said motor may be stopped at will by merely completely manually releasing pushbutton 7; inasmuch as limit switch LS will then be in open position.

If, during operation of motor M at slow speed for mixing the dough, it is desired to operate motor M at fast speed, it is only necessary to effect manual closure of pushbutton switch 9. This first completes an energizing circuit for the operating winding $FR^3$ of relay FR; which circuit may be traced from line $L^3$ by conductor 10 through normally closed pushbutton switch 8, by conductors 11 and 22 through limit switch LS, by conductors 23 and 20 through the auxiliary contacts $S^6$ of contactor S, by conductors 21 and 24 through the contacts $9^a$ of pushbutton switch 9, by conductor 25 through said winding $FR^3$, and by conductors 26 and 17 to line $L^1$.

Upon closure of the normally open contacts $FR^2$ of relay FR a maintaining circuit is completed for the winding $FR^3$; said circuit extending from line $L^3$ through pushbutton switch 8 and limit switch LS, thence by conductors 23 and 27 through said contacts $FR^2$, and by conductors 28 and 25 through winding $FR^3$ to line $L^1$, as heretofore traced. Upon opening of the normally closed contacts FR¹ of relay FR the energizing circuit of the winding S⁴ is interrupted, and the normally closed contacts S⁵ of the latter, when reclosed, effect completion of an energizing circuit for the operating winding F⁷ of contactor F. Said circuit extends from line L³ through pushbutton switch 8, limit switch LS, relay contacts FR², and conductors 28 and 25 to conductor 29, through said normally closed contacts S⁵ of contactor S, and by conductor 30 through winding F⁷ and conductor 17 to line L¹.

With windings FR³ and F⁷ thus energized, during operation of motor M at fast speed for mixing, the energizing circuit for the former will be maintained through pushbutton switch 8, limit switch LS and contacts FR², and the energizing circuit for the latter will be maintained by the same means, plus the normally closed contacts S⁵ of contactor S; said maintaining circuits, of course, being independent of the pushbutton switch 9, which may therefore be manually released. Such fast speed operation of motor M will be continued pending momentary depression of the "Stop" pushbutton switch 8, as will be obvious.

On the other hand, if the dough mixing machine is moved (manually or otherwise) to the dumping position thereof shown in dotted lines limit switch LS will be opened, as indicated by dotted lines, and hence the fast speed operation of motor M will be discontinued immediately, unless at the time the contacts 7ª, 7ᶜ of pushbutton switch 7 are manually held in engagement. Complete manual release of pushbutton switch 7 under such conditions will, of course, effect interruption of the motor circuit.

While I have herein shown the motor M as being of the three phase, single winding, constant torque type, it is to be understood that a three phase, single winding, variable torque type motor might be substituted therefor, if desired. Moreover, it is obvious that various other types of motors, having alternative circuit connections to provide for slow speed or fast speed operation thereof might be employed.

It is to be understood that the paddles P are always rotated in the same direction, as indicated by the dotted line arrow Z, so that upon movement of the machine D to dumping position said paddles will act to kick the finished dough out of the machine into a cart Y or other suitable form of container, whereby the same may be conveyed to the desired point of use.

I claim:

1. In a control system for a motor having a slow speed connection and a fast speed connection, a slow speed contactor adapted when closed by energization of the operating coil thereof to complete said slow speed motor connection, a fast speed contactor adapted when closed to complete said fast speed motor connection, a slow speed pushbutton switch having two normally open sets of contacts, one set of contacts being adapted when initially closed to energize said operating coil of said slow speed contactor, the other set of contacts being adapted when closed to provide an alternative energizing circuit for said coil in series with a normally open auxiliary interlock on said slow speed contactor, a normally open fast speed pushbutton switch, means including a relay having normally closed and normally open contacts respectively effective upon closure of said fast speed pushbutton switch after closure of said slow speed pushbutton switch to deenergize the operating coil of said slow speed contactor and to energize the operating coil of said fast speed contactor, and said normally open contacts of said relay when closed providing a maintaining circuit for said fast speed contactor in series with the second mentioned contacts on said slow speed pushbutton switch, whereby the operating coil of said fast speed contactor will be deenergized under given conditions only after complete manual release of said slow speed pushbutton switch.

2. In a control system for a motor having a slow speed connection and a fast speed connection, a slow speed contactor adapted when closed by energization of the operating coil thereof to complete said slow speed motor connection, a fast speed contactor adapted when closed to complete said fast speed motor connection, a slow speed pushbutton switch having two normally open sets of contacts, one set of contacts being adapted when initially closed to energize said operating coil of said slow speed contactor, the other set of contacts being adapted when closed to provide an alternative energizing circuit for said coil in series with a normally open auxiliary interlock on said slow speed contactor, a normally open fast speed pushbutton switch, means including a relay effective upon closure of said fast speed pushbutton switch after closure of said slow speed pushbutton switch to deenergize the operating coil of said slow speed contactor and to energize the operating coil of said fast speed contactor, said relay having normally open contacts adapted when closed to provide a maintaining circuit for said fast speed contactor in series with the second mentioned contacts on said slow speed pushbutton switch, the operating coil of said relay being subject to energization control by said slow speed and fast speed pushbutton switches jointly, the arrangement being such that the operating coil of said fast speed contactor will be deenergized under given conditions only after complete manual release of said slow speed pushbutton switch, and means including a limit switch arranged in parallel with said second mentioned contacts on said slow speed pushbutton switch, said limit switch when closed being adapted to maintain the energizing circuit of either the slow speed or fast speed contactor independently of both the slow speed and fast speed pushbutton switches.

3. In a control system for a motor having a slow speed connection and a fast speed connection, a slow speed contactor adapted when closed by energization of the operating coil thereof to complete said slow speed motor connection, a fast speed contactor adapted when closed to complete said fast speed motor connection, a slow speed pushbutton switch having two normally open sets of contacts, one of said sets of contacts being adapted when initially closed to energize said operating coil of said slow speed contactor, the other of said sets of contacts being adapted when closed to provide an alternative energizing circuit for said coil in series with a normally open auxiliary interlock on said slow speed contactor, a normally open fast speed pushbutton switch, means including a relay effective upon closure of said fast speed pushbutton switch after complete closure of said slow speed pushbutton switch to deenergize the operating coil of said slow speed contactor and to energize the operating coil of said fast speed contactor, said relay having normally open contacts adapted when closed to provide a maintaining circuit for said fast speed contactor in series with the second mentioned contacts on said slow speed pushbutton switch, and means to cause said second mentioned contacts on said slow speed pushbutton switch to break circuit only after said first mentioned contacts thereon have broken circuit, whereby complete manual release of said slow speed pushbutton switch is required to effect interruption of said maintaining circuit.

4. In a control system for a motor having a slow speed connection and a fast speed connection, a slow speed contactor adapted when closed by energization of the operating coil thereof to complete said slow speed motor connection, a fast speed contactor adapted when closed to complete said fast speed motor connection, a slow speed pushbutton switch having two normally open sets of contacts, one set of contacts being adapted when initially closed to energize said operating coil of said slow speed contactor, the other set of contacts being adapted when closed to provide an alternative energizing circuit for said coil in series with a normally open auxiliary interlock on said slow speed contactor, a normally open fast speed pushbutton switch, means including a relay effective upon closure of said fast speed pushbutton switch after complete closure of said slow speed pushbutton switch to deenergize the operating coil of said slow speed contactor and to energize the operating coil of said fast speed contactor, said relay having normally open contacts adapted when closed to provide a maintaining circuit for said fast speed contactor in series with the second mentioned contacts on said slow speed pushbutton switch, means to cause said second mentioned contacts on said slow speed pushbutton switch to break circuit only after said first mentioned contacts thereon have broken circuit, whereby complete manual release of said slow speed pushbutton switch is required to effect interruption of said maintaining circuit, and means including a limit switch adapted to be closed under given conditions, said limit switch when closed being adapted to render the slow speed pushbutton switch incapable of interrupting said maintaining circuit.

5. In a control system for a motor having a slow speed connection and a fast speed connection, a slow speed contactor adapted when closed by energization of the operating coil thereof to complete said slow speed motor connection, a fast speed contactor adapted when closed to complete said fast speed motor connection, a slow speed pushbutton switch having two normally open sets of contacts, one set of contacts being adapted when initially closed to energize said operating coil of said slow speed contactor, the other set of contacts being adapted when closed to provide an alternative energizing circuit for said coil in series with a normally open auxiliary interlock on said slow speed contactor, a normally open fast speed pushbutton switch, means including a relay effective upon closure of said fast speed pushbutton switch after complete closure of said slow speed pushbutton switch to deenergize the operating coil of said slow speed contactor and to energize the operating coil of said fast speed contactor, said relay having normally open contacts adapted when closed to provide a maintaining circuit for said fast speed contactor in series with the second mentioned contacts on said slow speed pushbutton switch, means to cause said second mentioned contacts on said slow speed pushbutton switch to break circuit only after said first mentioned contacts thereon have broken circuit, whereby complete manual release of said slow speed pushbutton switch is required to effect interruption of said maintaining circuit, means including a limit switch adapted to be closed under given conditions, said limit switch when closed being adapted to render said slow speed pushbutton switch incapable of interrupting said maintaining circuit, and a third pushbutton switch having normally closed contacts, said last mentioned contacts when opened being adapted to insure deenergization of the slow speed and fast speed contactors.

6. In a control system for the driving motor of a dough mixing machine or the like having an upright mixing position and a tilted dumping position, wherein operation of the motor at either a slow speed or a fast speed under both mixing and dumping conditions is required, in combination, a slow speed contactor having an operating coil adapted when energized to provide for slow speed operation of said motor, a fast speed contactor having an operating coil adapted when energized to provide for fast speed operation of said motor, a slow speed pushbutton switch having two normally open sets of contacts one of which sets is adapted when initially closed to energize the operating coil of said slow speed contactor, the other set of contacts of said switch being adapted when closed to provide an alternative energizing circuit for said coil in series with a normally open interlock on said slow speed contactor, a fast speed pushbutton switch having a normally open set of contacts adapted upon closure thereof, but only after closure of both sets of contacts of said slow speed pushbutton switch, to effect operating energization of said fast speed contactor, means including a limit switch which is closed when said machine is in its upright position, whereby upon temporary closure of said slow speed pushbutton switch, or of said slow speed and fast speed pushbutton switches jointly, the slow speed or fast speed contactors will be energized to provide for continuous operation of said motor at slow speed or fast speed, by virtue of a maintaining circuit established by said limit switch, exclusive of said pushbutton switches, and said mixing machine when moved to dumping position being adapted to effect opening of said limit switch, to insure interruption of said last mentioned maintaining circuit.

7. In combination, an electric driving motor, a plurality of electromagnetic means operable selectively to effect connection of said motor to a source of current supply to provide for either slow speed operation or fast speed operation thereof, manually operable switching means for selectviely controlling energization of said electromagnetically operable connecting means, electrical interlocking means including an electromagnetically operable relay having contact parts respectively interposed between each of said connecting means and said manually operable switching means to require connection of said motor to said source for slow speed operation thereof prior to connection thereof to said source for fast speed operation in each instance, said electromagnetically operable relay also coacting with said manually operable switching means to insure complete disconnection of said motor from said source as an incident to changing from fast speed operation to slow speed operation thereof, said manually operable switching means including a pushbutton switch having a pair of contactors adapted when depressed to bridge their cooperating contacts in a predetermined sequence and to disengage their cooperating contacts in reverse sequence upon manual release of said pushbutton, said contactor first to bridge its cooperating contacts being initially incapable of effecting any control of said connecting means, but the same being adapted to maintain the control effected by the contactor last to bridge its cooperating contacts pending complete manual release of said bushbutton.

8. In combination, an electric driving motor, a plurality of electromagnetic means operable selectively to effect connection of said motor to a source of current supply to provide for either slow speed operation or fast speed operation thereof, manually operable switching means for selectively controlling energization of said electromagnetically operable connecting means, electrical interlocking means including an electromagnetically operable relay having contact parts respectively interposed between each of said connecting means and said manually operable switching means to require connection of said motor to said source for slow speed operation thereof prior to connection thereof to said source for fast speed operation in each instance, said electromagnetically operable relay also acting to insure complete disconnection of said motor from said source as an incident to changing from fast speed operation to slow speed operation thereof, a limit switch normally biased to closed position, means for moving said limit switch to open position under given conditions, said limit switch when closed acting to maintain given circuit connections for said motor independently of that portion of the manually operable switching means whose operation was required to effect completion of such circuit connections, and said manually operable switching means including a normally closed pushbutton switch electrically connected in series with said limit switch and depressible at will to render the latter ineffective for maintaining said given circuit connections.

9. In combination, an electric motor, a plurality of electromagnetic switches operable selectively to effect connection of said motor to a source of current supply to provide for either slow speed operation or fast speed operation thereof, manually operable switching means of the pushbutton type for selectively controlling energization of said electromagnetically operable connecting means, said manually operable switching means including a pushbuttom switch having a pair of contactors adapted to bridge their cooperating contacts in a predetermined sequence and to disengage their cooperating contacts in reverse sequence upon manual release of said pushbutton switch, the contactor first to bridge its cooperating contacts being initially incapable of effecting any control of said electromagnetically operable connecting means, but the same being adapted to maintain the control effected by the contactor last to bridge its cooperating contacts pending complete manual release of said pushbutton switch.

RICHARD B. HUNTER.

REFERENCES CITED

The following references are of record in the file of this patent:

UNITED STATES PATENTS

| Number | Name | Date |
|---|---|---|
| 2,186,254 | Mahnke | Jan. 9, 1940 |